US010933870B2

(12) United States Patent
Kallmeyer et al.

(10) Patent No.: US 10,933,870 B2
(45) Date of Patent: Mar. 2, 2021

(54) DRIVER ASSISTANCE DEVICE FOR PARTIALLY AND FULLY AUTONOMOUS GUIDANCE OF A TRANSPORTATION VEHICLE, METHOD, AND TRANSPORTATION VEHICLE

(71) Applicant: VOLKSWAGEN AKTIENGESELLSCHAFT, Wolfsburg (DE)

(72) Inventors: Felix Kallmeyer, Wolfsburg (DE); Jens Hoedt, Hannover (DE); Samuel Schacher, Berlin (DE)

(73) Assignee: Volkswagen Aktiengesellschaft

( * ) Notice: Subject to any disclaimer, the term of this patent is extended or adjusted under 35 U.S.C. 154(b) by 172 days.

(21) Appl. No.: 16/112,913

(22) Filed: Aug. 27, 2018

(65) Prior Publication Data

US 2019/0071078 A1  Mar. 7, 2019

(30) Foreign Application Priority Data

Sep. 5, 2017  (DE) ...................... 10 2017 215 592.2

(51) Int. Cl.
*B60W 30/10* (2006.01)
*B60W 30/095* (2012.01)
(Continued)

(52) U.S. Cl.
CPC ........ *B60W 30/10* (2013.01); *B60W 30/0953* (2013.01); *B60W 40/08* (2013.01);
(Continued)

(58) Field of Classification Search
CPC .... B60W 30/10; B60W 40/09; B60W 50/082; B60W 50/14; B60W 30/0953; G05D 1/0212; G05D 1/0088; G05D 2201/0213
See application file for complete search history.

(56) References Cited

U.S. PATENT DOCUMENTS

| 2007/0193798 | A1* | 8/2007 | Allard | .................. B60T 7/22 |
| | | | | 180/169 |
| 2007/0219720 | A1* | 9/2007 | Trepagnier | .......... B60W 30/095 |
| | | | | 701/300 |

(Continued)

FOREIGN PATENT DOCUMENTS

| DE | 102007061900 A1 | 6/2009 |
| DE | 102008054207 A1 | 6/2009 |

(Continued)

OTHER PUBLICATIONS

Machine Translation to English of EP2858060.*

(Continued)

*Primary Examiner* — Rami Khatib
(74) *Attorney, Agent, or Firm* — Barnes & Thornburg LLP

(57) ABSTRACT

A driving assistance device for the semi-autonomous and fully autonomous guidance of a transportation vehicle, wherein the driving assistance device calculates potential return trajectories for the respective return of a transportation vehicle from an initial condition, which deviates from a predefined target trajectory, to the target trajectory, wherein each return trajectory satisfies a respective predetermined driving dynamics profile which defines a permissible value range of a total acceleration, and to which a respective degree of autonomy is assigned. The driving assistance device selects the return trajectories which satisfy a selection criterion with at least one boundary condition as suitable return trajectories, and from the suitable return trajectories identifies that whose driving dynamics profile has a minimum degree of autonomy as the suitable return trajectory and intervenes in the guidance of the transportation vehicle based on the degree of autonomy of the driving dynamics profile of the selected suitable return trajectory.

18 Claims, 3 Drawing Sheets

(51) Int. Cl.
  *G05D 1/02* (2020.01)
  *B60W 50/14* (2020.01)
  *B60W 50/08* (2020.01)
  *B60W 40/09* (2012.01)
  *B60W 40/08* (2012.01)
  *B60W 40/107* (2012.01)
  *G05D 1/00* (2006.01)

(52) U.S. Cl.
  CPC .......... *B60W 40/09* (2013.01); *B60W 40/107* (2013.01); *B60W 50/082* (2013.01); *B60W 50/14* (2013.01); *G05D 1/0088* (2013.01); *G05D 1/0212* (2013.01); *G05D 1/0217* (2013.01); *G05D 2201/0213* (2013.01)

(56) References Cited

U.S. PATENT DOCUMENTS

| | | | |
|---|---|---|---|
| 2008/0183342 A1* | 7/2008 | Kaufmann | B60K 28/066 701/1 |
| 2013/0131947 A1 | 5/2013 | Takahashi et al. | |

FOREIGN PATENT DOCUMENTS

| | | |
|---|---|---|
| DE | 102008062916 A1 | 6/2010 |
| DE | 102009020649 A1 | 11/2010 |
| DE | 102012203187 A1 | 9/2012 |
| EP | 2858060 A2 | 4/2015 |

OTHER PUBLICATIONS

Düring et al.; Adaptive Cooperative Maneuver Planning Algorithm for Conflict Resolution in Diverse Traffic Situations; IEEE International Conference on Connected Vehicles and Expo (ICCVE); 2014.

Erlien et al.; Shared Steering Control Using Safe Envelopes for Obstacle Avoidance and Vehicle Stability; IEEE Transactions on Intelligent Transportation Systems; 2015.

Werling; A New Concept for the Trajectory Generation and Stabilization in Time-Critical Traffic Scenarios; Dissertation; 2010.

* cited by examiner

DRIVER ASSISTANCE DEVICE FOR PARTIALLY AND FULLY AUTONOMOUS GUIDANCE OF A TRANSPORTATION VEHICLE, METHOD, AND TRANSPORTATION VEHICLE

PRIORITY CLAIM

This patent application claims priority to German Patent Application No. 10 2017 215 592.2, filed 5 Sep. 2017, the disclosure of which is incorporated herein by reference in its entirety.

SUMMARY

Illustrative embodiments relate to a driving assistance device configured for the semi-autonomous and fully autonomous guidance of a transportation vehicle, to a method, and to an associated transportation vehicle.

BRIEF DESCRIPTION OF THE DRAWINGS

An exemplary embodiment is described in the following drawings, in which.

DETAILED DESCRIPTION

Figure 1:
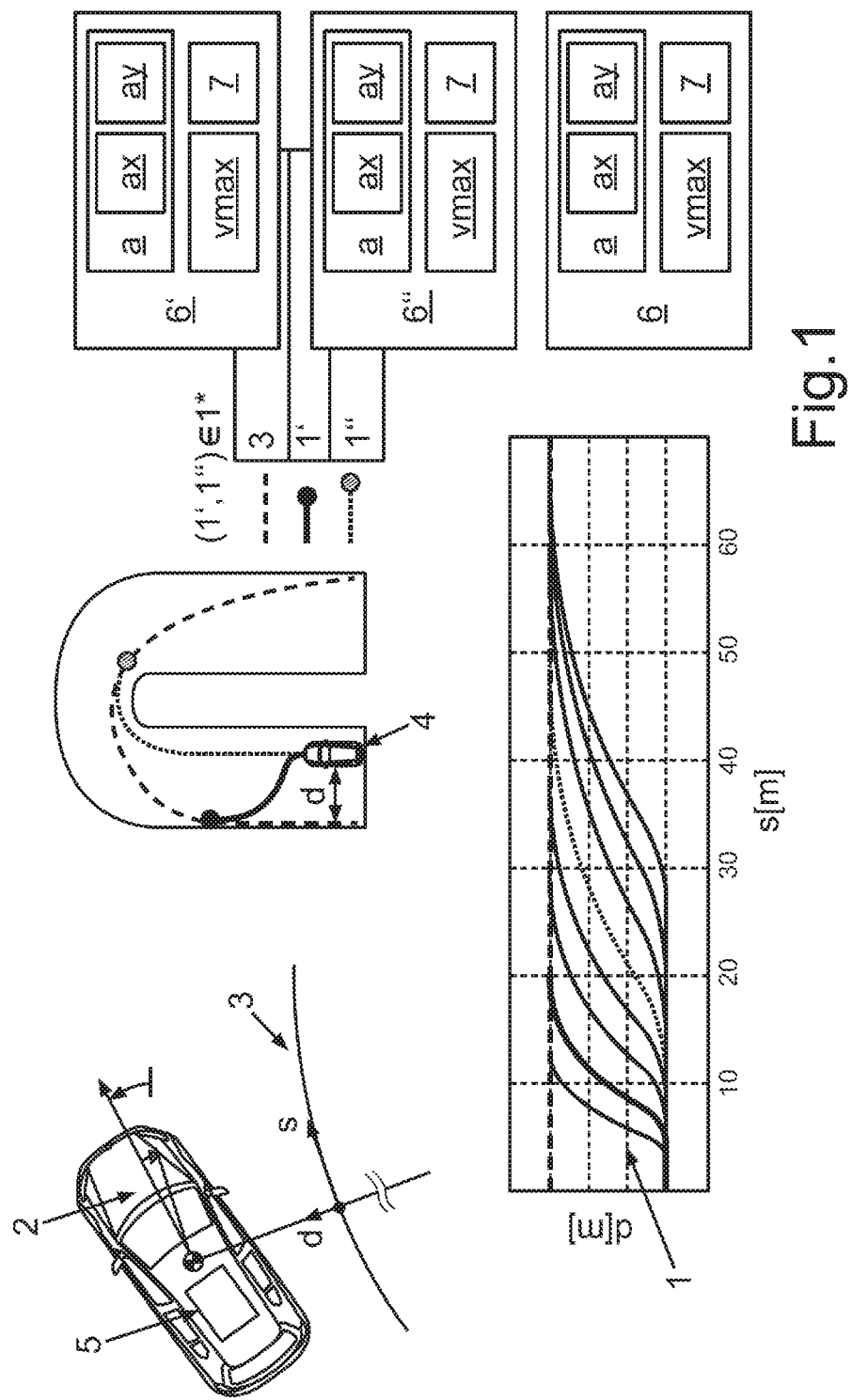
FIG. 1 shows potential return trajectories.

To optimize driving dynamics and safety, a transportation vehicle can be provided with a driving assistance device which can intervene in the guidance or control of the transportation vehicle. As a rule, the transportation vehicle is driven by a driver and the intervention of the driving assistance device in the guidance takes place only under predetermined conditions, such as a predetermined critical driving dynamics. Examples of such driving assistance devices are, for example, the electronic stability control, which affects the longitudinal guidance of the transportation vehicle, and active lane maintenance assistants, which engage in the transverse guidance of the transportation vehicle to keep it in a lane. Driving assistance devices are generally configured to intervene only in predetermined critical situations. It would be beneficial to have a predictive intervention of a driving assistance device before the transportation vehicle reaches in a critical driving-dynamics region, taking into account the individual driving behavior of the driver, to take the driver's skill into account.

The dissertation "Ein neues Konzept für die Trajektoriengenerierung und—stabilisierung in zeitkritischen Verkehrsszenarien" [A new concept for trajectory generation and stabilization in time-critical traffic scenarios], Moritz Werling, Karlsruhe Institute of Technology, 2010; describes a method for calculating trajectories. The method does not, however, comprise any facility for adapting trajectories to the capabilities of a driver.

In the dissertation "Shared vehicle control using safe driving envelopes for obstacle avoidance and stability", Stephen Erlien, Stanford University, 2015; a system is described which intervenes in a guidance process of a transportation vehicle.

US 2013/131947 A1 describes a method and a device for driving assistance. The described device is configured to detect a path of a curve which is located in the driving direction of a transportation vehicle, and on the basis of the curve path to intervene in the longitudinal guidance of the transportation vehicle in a predictive manner.

Disclosed embodiments provide a driving assistance device which enables a predictive intervention in the guidance of a transportation vehicle.

A driving assistance device is provided, which is configured for the semi-autonomous and fully autonomous guidance of a transportation vehicle. The driving assistance device is configured to calculate potential return trajectories for the respective return of a transportation vehicle from an initial condition, which deviates from a predefined target trajectory, to the target trajectory. Each of the return trajectories satisfies a respective predetermined driving dynamics profile which defines in each case a permissible value range of a total acceleration (comprising a longitudinal acceleration component and a transverse acceleration component), and to which a respective degree of autonomy is assigned. The driving assistance device is configured to select from these such return trajectories as satisfy a selection criterion with at least one predetermined boundary condition as a suitable return trajectory and from the suitable return trajectories to identify the one whose driving dynamics profile has the minimum degree of autonomy, and then to intervene in the guidance of the transportation vehicle depending on the degree of autonomy of this driving dynamics profile of the selected suitable return trajectory to implement this return trajectory. In other words, a driving assistance device is provided, which can drive a transportation vehicle either alone or in cooperation with a driver of the transportation vehicle. The driving assistance device is configured to calculate trajectories for a transportation vehicle that is located outside of a target trajectory at an initial condition and is to be returned to the target trajectory. Each of the return trajectories is assigned a predetermined driving dynamics profile which defines overall acceleration values that are allowed to occur in following the return trajectory. A given return trajectory does not always satisfy every driving dynamics profile. The assigned driving dynamics profile can be extracted, for example, from a plurality of predefined driving dynamics profiles. Such a driving dynamics profile which is actually satisfied by the return trajectory will then be assigned. Each driving dynamics profile is also assigned a respective degree of autonomy, which defines the extent to which the driving assistance device intervenes in the guidance of the transportation vehicle when the associated return trajectory is followed. The method therefore presupposes a plurality of potential return trajectories, to each of which a driving dynamics profile (together with a corresponding degree of autonomy) is already assigned.

From among these calculated potential return trajectories the driving assistance device then identifies all those return trajectories which are suitable based on the satisfaction of the selection criterion in the current initial situation, and from these suitable return trajectories in turn selects the one return trajectory whose driving dynamics profile has the minimum degree of autonomy. The driving assistance device is configured to implement the selected suitable return trajectory, wherein it intervenes in the guidance of the transportation vehicle in accordance with the degree of autonomy of the associated driving dynamics profile of this return trajectory. The driving dynamics profile defines a permissible range of values of the total acceleration and, optionally, a maximum speed. A driving assistance device can be a control unit, which comprises a microcontroller and/or a microprocessor and is configured to calculate return trajectories. These return trajectories can return the transportation vehicle from the initial condition, which can describe a current geographic position, a current speed and/or a current acceleration of the transportation vehicle, back to the specified target trajectory, so that at the end of the return trajectory the transportation vehicle satisfies a condition of the specified target trajectory. The specified target trajectory can be a path curve, which defines a chronological course of a geographical position, a speed and an acceleration of a transportation vehicle. This may have been calculated by a calculation method according to the prior art. A trajectory generally produces a value range which comprises values of a total acceleration which occur when the respective return trajectory is followed. The total acceleration comprises a longitudinal component, which relates to the acceleration in the longitudinal direction of the transportation vehicle, and a lateral acceleration component, which relates to the acceleration transverse to the longitudinal direction of the transportation vehicle.

In the driving assistance device, a plurality of predefined driving dynamics profiles can be stored, each of which can define a permissible range of values for the total acceleration. If a value range of a return trajectory is completely covered by the permissible value range of a driving dynamics profile, then the return trajectory fulfils the respective driving dynamics profile. It may be the case that a return trajectory also satisfies more than one driving dynamics profile. Each driving dynamics profile is also assigned a degree of autonomy, which indicates the extent to which the driving assistance device intervenes in the guidance of the transportation vehicle if the return trajectory which is assigned to the driving dynamics profile is followed. If a return trajectory satisfies more than one of the specified driving dynamics profiles, then it is assigned the driving dynamics profile from this set which has the lowest degree of autonomy. A plurality of return trajectories can now be assumed to exist, each of which is assigned exactly one driving dynamics profile.

The additional selection criterion relating to the current initial situation can then define at least one boundary condition, which the return trajectory that is ultimately used must satisfy, so that it is regarded as suitable for a return of the transportation vehicle even under the existing initial condition.

From the suitable return trajectories the driving assistance device can identify a selected suitable return trajectory, the associated driving dynamics profile of which is assigned a minimum intervention of the driving assistance devices in the guidance of the transportation vehicle among all of the suitable return trajectories. According to the degree of autonomy of the driving dynamics profile of the selected suitable return trajectory, the driving assistance device can intervene in the guidance of the transportation vehicle. Thus the driving dynamics profile of the identified return trajectory can be assigned an intervention in a longitudinal guidance of the transportation vehicle, while the transverse guidance remains under the control of the driver. The driving assistance device can comprise, for example, a microcontroller and/or a microprocessor.

The disclosed embodiments enable an intervention depending on driving dynamics profiles, wherein the intervention of the driving assistance device in the transportation vehicle guidance is kept to a minimum.

An extension provides that the driving assistance device is configured to carry out an intervention depending on the degree of autonomy of the selected suitable return trajectory, in such a way that the transportation vehicle is guided either by a driver alone or semi-autonomously by the driver and the driving assistance device, or autonomously by the driving assistance device. In other words, the driving assistance device is configured to intervene in the guidance of the transportation vehicle, wherein the extent of the intervention is defined by the degree of autonomy of the driving dynamics profile of the selected suitable return trajectory. It is also provided that the guidance is performed by a driver of the transportation vehicle alone, or that the guidance is performed by a driver of the transportation vehicle, wherein the driving assistance device either intervenes in the guidance, or the transportation vehicle is controlled by the driving assistance device alone. For example, it may be the case that the driving assistance device intervenes in the longitudinal guidance of a driving dynamics profile of the transportation vehicle, which can include, for example, braking and/or accelerating, the transverse guidance, which can include, for example, steering, is performed by the driver of the transportation vehicle. The resulting benefit is that the extent of the intervention of the driving assistance device can be made to be dependent on the driving dynamics of the suitable return trajectory selected.

An extension provides that the driving assistance device is configured to emit visual and/or haptic and/or acoustic warning signals concerning a transverse guidance and/or longitudinal guidance according to the suitable return trajectory selected. In other words, the driving assistance device is configured to emit visual and/or haptic and/or acoustic warning signals, wherein the warning signals are dependent on a transverse and/or longitudinal guidance, which is necessary to follow the suitable return trajectory selected. For example, it may be the case that an angle of the steering wheel to be set by the driver is displayed on the windshield, which is necessary to follow the suitable return trajectory selected. This results in the benefit that it allows a driver to follow a selected, suitable return trajectory without interventions in the transportation vehicle guidance by the driving assistance device.

An extension provides that the respective driving dynamics profile comprises a maximum longitudinal speed. In other words, a respective driving dynamics profile defines a maximum permissible speed which a transportation vehicle is allowed to reach when traveling along a return trajectory. It can be provided that a driving dynamics profile restricts the speed to 130 km/h. This results in the benefit that statutory speed limits can be observed when traveling along a return trajectory.

In an extension it is provided that a particular driving dynamics profile depends on a geographical position of the target trajectory. In other words, the permissible values of the total acceleration and/or the maximum longitudinal speed of a driving dynamics profile have a spatial dependency. It is thus possible that the permissible longitudinal speed within a residential area is limited to 50 km/h or the total acceleration in areas which are not level is more restricted than in level areas. This results in the benefit that the driving dynamics can be adapted to the local conditions.

An extension of the disclosure provides that the at least one predetermined boundary condition of the selection criterion comprises compliance with a spatial constraint. In other words, the boundary conditions comprise criteria applying to a spatial course of the suitable return trajectories. For example, the boundary conditions can require that the course of the suitable return trajectories must lie within a predetermined geographic area, such as a surface of a road or a lane of a road. The boundary conditions can also include the condition that a predetermined minimum distance from objects, such as other road users or signs, must be observed.

This results in the benefit that return trajectories which are unsuitable due to their spatial shape are excluded.

An extension provides that the driving assistance device is configured, after the identification of the suitable return trajectories, to calculate a confidence value which describes a ratio of the number of potential return trajectories to the number of suitable return trajectories, and to select from the suitable return trajectories the return trajectory whose driving dynamics profile has the minimum degree of autonomy, only in the event that the confidence value is greater than a predetermined threshold confidence value. In other words, the driving assistance device is configured to calculate a ratio between the number of potential return trajectories to the number of suitable return trajectories and to check whether the confidence value thus calculated is greater than a predefined threshold confidence value. If the value of the calculated actual confidence value is greater than the predefined threshold confidence value, a return trajectory is selected from the suitable return trajectories whose driving dynamics profile has the minimum degree of autonomy. This results in the benefit that the guidance is performed by the driving assistance device when a guidance of the transportation vehicle by a driver becomes too dangerous because the driver could make misjudgments. It is thus possible that the driving assistance device selects the return trajectory of a predetermined driving dynamics profile, which provides, for example, an autonomous guidance of the transportation vehicle, when only 20% of the calculated return trajectories are suitable. In general, the threshold confidence value can lie in a range from 1% to 80%. Alternatively, the driving assistance device can perform the selection of the return trajectory depending on the degree of autonomy. Otherwise, thus if the confidence value is not greater than the threshold confidence value, a predetermined return trajectory can be selected whose associated driving dynamics profile can have a maximum driving dynamics and/or a maximum autonomy.

An extension of the disclosure provides that the permissible total acceleration in each driving dynamics profile is defined by a GG profile. In other words, a respective driving dynamics profile comprises a range of values relating to the permissible total acceleration, which is defined by a GG profile. A GG profile comprises an axis which relates to the lateral acceleration component and an axis which relates to the longitudinal acceleration component. The name GG profile is derived from the symbol for the acceleration due to gravity G. In this GG profile a closed range of values is defined which comprises permissible values of the total acceleration. A GG profile is a common representation used to describe an acceleration behavior of a driver and/or a transportation vehicle. For example, this could be a Kamm circle, i.e., a circle with the magnitude of the total acceleration as its radius. The GG profile can also be a value range defined by modification parameters, which is based on a Kamm circle. This results in the benefit that a permissible total acceleration, comprising a longitudinal acceleration component and a transverse acceleration component, can be defined according to a standard for describing a transportation vehicle dynamics.

The disclosed embodiments also comprise a method for operating a driving assistance device.

The disclosed embodiments also comprise a transportation vehicle having a driving assistance device.

The disclosed embodiments also include extensions of the disclosed method and the disclosed transportation vehicle, which have features that have already been described in the context of the extensions of the disclosed driving assistance device.

In the exemplary embodiment, the components of the embodiment described represent individual features to be considered independently of each other, which also extend the disclosure independently of each other and thus are also to be regarded, either individually or in a combination other than the one shown, as an integral part of the disclosure. Furthermore, the embodiment described can also be extended to include other features already described.

In the figures, functionally equivalent elements are provided with the same reference numerals.

FIG. 1 shows potential return trajectories 1 for the respective return of a transportation vehicle 2 back to a predetermined target trajectory 3. The transportation vehicle 2 may be located at an initial condition 4, which deviates from a specified target trajectory 3. A target trajectory 3 can be a predetermined path curve, which a transportation vehicle 2 is to be driven along. The initial condition 4 can comprise a position of the transportation vehicle 2 and a speed. A driving assistance device 5 can, in accordance with respective driving dynamics profiles 6, calculate respective return trajectories 1 which return the transportation vehicle 2 to the target trajectory 3. A driving dynamics profile 6 can define, for example, by a GG profile, a permissible value range of a total acceleration a, comprising a longitudinal acceleration component ax and a lateral acceleration component ay. A driving dynamics profile 6 can also comprise a respective maximum speed vmax. A respective driving dynamics profile 6 can be assigned a degree of autonomy 7. The degree of autonomy 7 describes the extent to which the driving assistance device 5 intervenes in the guidance of the transportation vehicle 2 while the assigned return trajectory 1 is being driven. For example, the guidance can be assigned to the driver alone, wherein the driving assistance device 5 does not intervene in the guidance. A semi-autonomous guidance can also be provided, wherein the guidance is performed by the driver and also influenced by the driving assistance device 5. For example, it is possible that a transverse guidance of the transportation vehicle is performed by the driver, while a longitudinal guidance is performed by the driving assistance device 5.

As an additional option, an autonomous guidance of the transportation vehicle 2 can be provided. This means that both the longitudinal guidance as well as the transverse guidance is performed by the driving assistance device 5 and the driver has no influence on the guidance. The figure shows a diagram comprising a family of return trajectories 1. Here, a deviation d relative to a target trajectory 3 is plotted against the longitudinal direction s of the target trajectory 3. As an example, two potential return trajectories 1',1" and the path of the target trajectory 3 are shown in a curve. A first return trajectory 1' may have been calculated on the basis of a driving dynamics profile 6, which corresponds to the driving dynamics of the current driver. The driving dynamics profile 6 can be assigned a degree of autonomy 7, which provides for no intervention in the guidance of the transportation vehicle 2 by the driving assistance device 5. Instead, it can be provided that the driving assistance device 5 informs the driver about necessary transverse accelerations and/or longitudinal accelerations by audible warning signals 8. A second return trajectory 1" can be based on a driving dynamics profile 6 which describes a maximum driving dynamics of the transportation vehicle 2.

Figure 2:
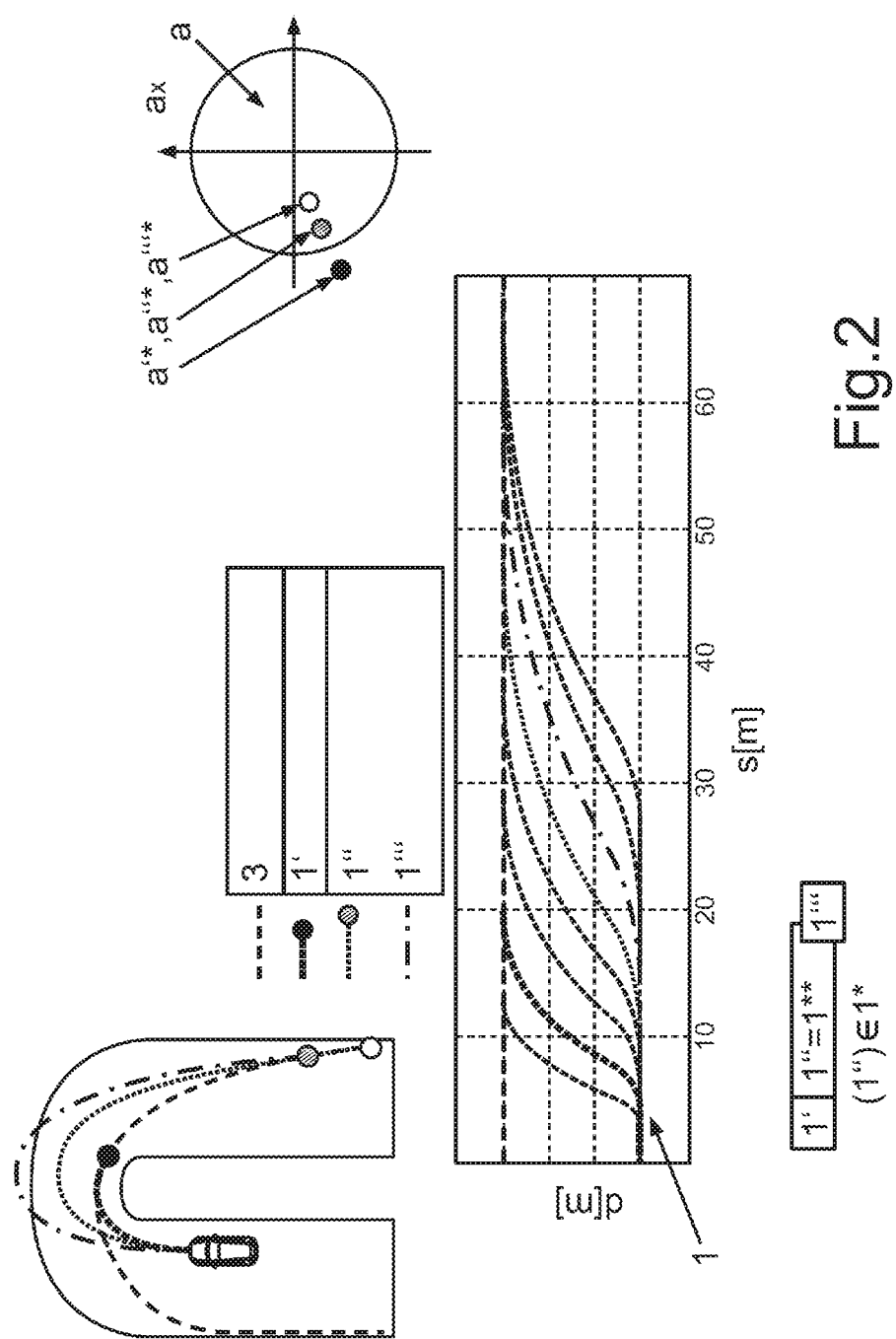
FIG. 2 shows the selection of suitable return trajectories.

FIG. 2 shows the selection of suitable return trajectories 1*. One diagram shows a family of potential return trajectories 1. By way of example, three return trajectories 1', 1", 1'" to a target trajectory 3 are shown, which have been calculated by the driving assistance device 5 according to respective driving dynamics profiles 6', 6", 6'''. Also shown is a GG diagram, which defines a permissible value range of a total acceleration a, comprising a longitudinal acceleration component ax and a lateral acceleration component ay. In the GG diagram the respective maximum values of the total acceleration a'*, a"*, a'''* are entered, which are reached but not exceeded when driving on the respective return trajectories 1', 1", 1'''. The driving assistance device 5 can select suitable return trajectories 1* from the family of the return trajectories 1. In so doing, the suitable return trajectories 1* must satisfy at least one predetermined boundary condition. It may be the case that a return trajectory 1''' leaves a spatial region, which may be the roadway, and is therefore not selected by the driving assistance device 5 as a suitable return trajectory 1*. A potential return trajectory 1 may depart from the permissible range of values of the total acceleration a and for this reason, will not be selected by the driving assistance device 5 as a suitable return trajectory 1*. A return trajectory 1' can extend within the driving lane and remain within the permissible range of values of the total acceleration a, and therefore fulfill all boundary conditions. For this reason, this return trajectory 1' is chosen as the selected suitable return trajectory 1** and the driving assistance device 5 intervenes depending on the degree of autonomy 7 of the driving dynamics profile 6' of this return trajectory 1'.

Figure 3:
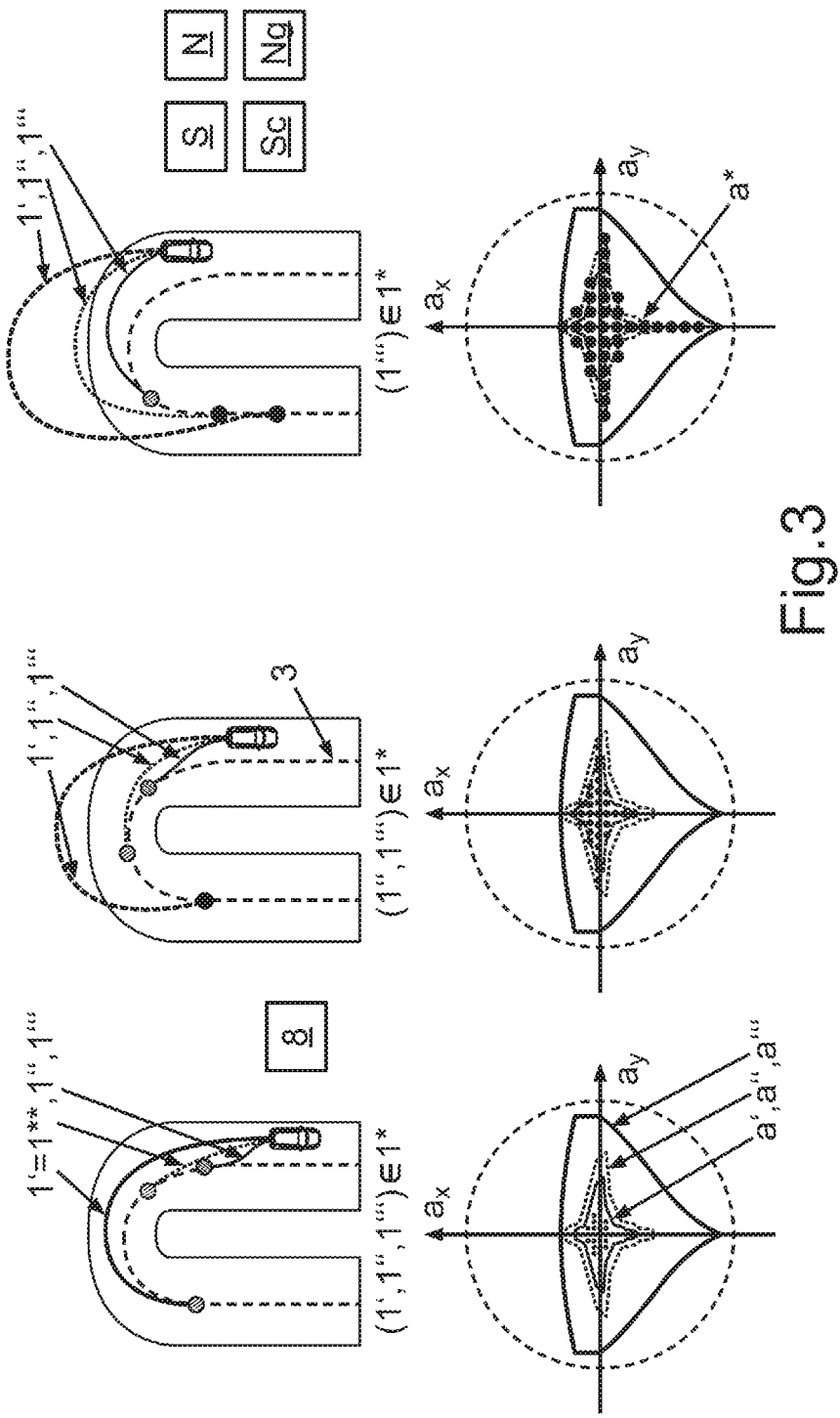
FIG. 3 shows the step-wise identification of the return trajectory.

FIG. 3 shows the step-by-step identification of the selected suitable return trajectory 1**. The figure shows the path of three calculated return trajectories 1', 1", 1''' under different initial conditions 4. Below each of these is a GG profile, which includes the permissible value ranges of the total acceleration a', a", a''' of the three driving dynamics profiles 6', 6", 6''' of the return trajectories 1', 1", 1' and the value range a* required for driving around the bend. The first return trajectory 1' is based on the driving dynamics of the driver. The assigned degree of autonomy 7 provides for no intervention of the driving assistance device 5 when the return trajectory 1' is driven. The second return trajectory 1" is based on a driving dynamics profile 6" which describes a defensive driving style. The assigned degree of autonomy 7 provides for an intervention in the longitudinal guidance by the driving assistance device 5. The third return trajectory 1''' is based on a driving dynamics profile 6''' with a dynamic driving style. In this case, the assigned degree of autonomy 7 provides for an autonomous guidance of the transportation vehicle 2 by the driving assistance device 5. In the first initial condition 4, the bend can be driven with a total acceleration a* which does not depart from any of the value ranges a', a", a''' of the three driving dynamics profiles 6', 6", 6'''.

As a result, all three return trajectories 1', 1", 1''' are suitable for driving around the bend. The driving assistance device 5 in this case identifies the first return trajectory 1' as the selected suitable return trajectory 1 to return the transportation vehicle 2 to the target trajectory 3, because its driving dynamics profile 6' is assigned the minimum degree of autonomy 7. It may be that the driving assistance device 5 issues warning signals 8 to the driver, so that he/she can control the transportation vehicle along the suitable return trajectory 1 selected. In the case of the second initial condition 4, the first return trajectory 1' extends outside of the roadway and thus fails to satisfy a boundary condition, because it does not comply with a spatial constraint. For this reason, it is not a suitable return trajectory 1*. In addition, the range of values a* for the total acceleration required to drive around the bend exceeds the permissible range of values a' of the first return trajectory 1'. For this reason, only the return trajectories 1",1''' are suitable return trajectories 1*.

Since the driving dynamics profile 6" of the second return trajectory 1" is assigned a lower value than the third return trajectory 1''', the second return trajectory 1' is chosen as the selected suitable return trajectory 1. In the third initial condition 4, only the third return trajectory 1''' meets the boundary conditions. For this reason, the driving assistance device 5 will control the transportation vehicle 2 autonomously along the third return trajectory 1'''. It may also be the case that the third return trajectory 1' is selected as the selected suitable return trajectory 1, because only one suitable return trajectory 1* is available from a total of three calculated return trajectories, and therefore a predetermined confidence value Sc=0.5 is not reached by S=Ng/N=1/3.

Overall, the example shows how a predictive, step-wise driving assistance device is provided by the disclosure.

LIST OF REFERENCE NUMERALS 1 potential driving trajectories
2 transportation vehicle
3 target trajectory
4 initial condition
5 driving assistance device
6 driving dynamics profiles
7 degree of autonomy
8 warning signals
a total acceleration
ax longitudinal acceleration component
ay transverse acceleration component
vmax maximum speed vmax
d deviation
s longitudinal direction
1', 1", 1''' return trajectories
6', 6", 6''' driving dynamics profiles
a', a", a''' highest total acceleration reached
1* suitable return trajectories
1** selected suitable return trajectory
a* necessary total acceleration
S confidence value
Sc predetermined confidence value
Ng number of suitable return trajectories
N number of calculated return trajectories

The invention claimed is:

1. A driving assistance device for semi-autonomous and/or fully autonomous guidance of a transportation vehicle, wherein the driving assistance device:

calculates potential return trajectories for the respective return of the transportation vehicle from an initial condition, which deviates from a predefined target trajectory, to the target trajectory, wherein each return trajectory satisfies a respective predetermined driving dynamics profile which defines a permissible value range of a total acceleration, comprising a longitudinal acceleration component and a transverse acceleration component, and to which a respective degree of autonomy is assigned;

identifies return trajectories from the potential return trajectories which satisfy a selection criterion with at least one predefined boundary condition as suitable return trajectories;

selects one of the suitable return trajectories having the driving dynamics profile with a minimum degree of autonomy relative to the driving dynamics profile of the other suitable return trajectories; and intervenes in the guidance of the transportation vehicle by controlling the transportation vehicle to drive semi-autonomously and/or fully autonomously along the selected suitable return trajectory based on the degree of autonomy of the driving dynamics profile of the selected suitable return trajectory.

2. The driving assistance device of claim 1, wherein the driving assistance device emits at least one of a visual, haptic, and acoustic warning signal concerning at least one of a transverse guidance and longitudinal guidance according to the selected suitable return trajectory.

3. The driving assistance device of claim 1, wherein the respective driving dynamics profile comprises a maximum longitudinal velocity.

4. The driving assistance device of claim 1, wherein the at least one predetermined boundary condition of the selection criterion comprises compliance with a spatial constraint.

5. The driving assistance device of claim 1, wherein the driving assistance device calculates a confidence value which describes a ratio of the number of potential return trajectories to the number of suitable return trajectories after identification of the suitable return trajectories, and selects from the suitable return trajectories only the return trajectory whose driving dynamics profile has the minimum degree of autonomy, in response to the confidence value being greater than a predetermined threshold confidence value.

6. The driving assistance device of claim 1, wherein the permissible value range of the total acceleration in the respective driving dynamics profile is defined by a GG profile comprising a first axis which relates to the longitudinal acceleration component and a second axis which relates to the transverse acceleration component.

7. A method for operating a driving assistance device for a transportation vehicle for driving assistance device for semi-autonomous and/or fully autonomous guidance of the transportation vehicle, wherein the driving assistance device:
calculates potential return trajectories for the respective return of the transportation vehicle from an initial condition, which deviates from a predefined target trajectory, to the target trajectory, wherein each return trajectory satisfies a respective predetermined driving dynamics profile which defines a permissible value range of a total acceleration, comprising a longitudinal acceleration component and a transverse acceleration component, and to which a respective degree of autonomy is assigned;
identifies return trajectories from the potential return trajectories which satisfy a selection criterion with at least one predefined boundary condition as suitable return trajectories;
selects one of the suitable return trajectories having the driving dynamics profile with a minimum degree of autonomy relative to the driving dynamics profile of the other suitable return trajectories; and
intervenes in the guidance of the transportation vehicle by controlling the transportation vehicle to drive semi-autonomously and/or fully autonomously along the selected suitable return trajectory based on the degree of autonomy of the driving dynamics profile of the selected suitable return trajectory.

8. The method of claim 7, wherein the driving assistance device emits at least one of a visual, haptic, and acoustic warning signal concerning at least one of a transverse guidance and longitudinal guidance according to the selected suitable return trajectory.

9. The method of claim 7, wherein the respective driving dynamics profile comprises a maximum longitudinal velocity.

10. The method of claim 7, wherein the at least one predetermined boundary condition of the selection criterion comprises compliance with a spatial constraint.

11. The method of claim 7, wherein the driving assistance device calculates a confidence value which describes a ratio of the number of potential return trajectories to the number of suitable return trajectories after identification of the suitable return trajectories, and selects from the suitable return trajectories only the return trajectory whose driving dynamics profile has the minimum degree of autonomy, in response to the confidence value being greater than a predetermined threshold confidence value.

12. The method of claim 7, wherein the permissible value range of the total acceleration in the respective driving dynamics profile is defined by a GG profile comprising a first axis which relates to the longitudinal acceleration component and a second axis which relates to the transverse acceleration component.

13. A transportation vehicle comprises a driving assistance device for semi-autonomous and/or fully autonomous guidance of the transportation vehicle wherein the driving assistance device:
calculates potential return trajectories for the respective return of the transportation vehicle from an initial condition, which deviates from a predefined target trajectory, to the target trajectory, wherein each return trajectory satisfies a respective predetermined driving dynamics profile which defines a permissible value range of a total acceleration, comprising a longitudinal acceleration component and a transverse acceleration component, and to which a respective degree of autonomy is assigned;
identifies return trajectories from the potential return trajectories which satisfy a selection criterion with at least one predefined boundary condition as suitable return trajectories;
selects one of the suitable return trajectories having the driving dynamics profile with a minimum degree of autonomy relative to the driving dynamics profile of the other suitable return trajectories; and
intervenes in the guidance of the transportation vehicle by controlling the transportation vehicle to drive semi-autonomously and/or fully autonomously along the selected suitable return trajectory based on the degree of autonomy of the driving dynamics profile of the selected suitable return trajectory.

14. The transportation vehicle of claim 13, wherein the driving assistance device emits at least one of a visual, haptic, and acoustic warning signal concerning at least one of a transverse guidance and longitudinal guidance according to the selected suitable return trajectory.

15. The transportation vehicle of claim 13, wherein the respective driving dynamics profile comprises a maximum longitudinal velocity.

16. The transportation vehicle of claim 13, wherein the at least one predetermined boundary condition of the selection criterion comprises compliance with a spatial constraint.

17. The transportation vehicle of claim 13, wherein the driving assistance device calculates a confidence value which describes a ratio of the number of potential return trajectories to the number of suitable return trajectories after identification of the suitable return trajectories, and selects from the suitable return trajectories only the return trajectory whose driving dynamics profile has the minimum degree of autonomy, in response to the confidence value being greater than a predetermined threshold confidence value.

18. The transportation vehicle of claim 13, wherein the permissible value range of the total acceleration in the respective driving dynamics profile is defined by a GG profile comprising a first axis which relates to the longitudinal acceleration component and a second axis which relates to the transverse acceleration component.

\* \* \* \* \*